United States Patent
Brandt (10) Patent No.: US 10,415,456 B2
(45) Date of Patent: Sep. 17, 2019

(54) COMBUSTION CHAMBER FOR AN INTERNAL COMBUSTION ENGINE AND AN INTERNAL COMBUSTION ENGINE

(71) Applicant: Volvo Truck Corporation, Göteborg (SE)

(72) Inventor: Richard S. Brandt, Fayetteville, PA (US)

(73) Assignee: Volvo Truck Corporation, Göteborg (SE)

( * ) Notice: Subject to any disclaimer, the term of this patent is extended or adjusted under 35 U.S.C. 154(b) by 149 days.

(21) Appl. No.: 15/303,000

(22) PCT Filed: Apr. 29, 2014

(86) PCT No.: PCT/US2014/035773
§ 371 (c)(1),
(2) Date: Oct. 9, 2016

(87) PCT Pub. No.: WO2015/167444
PCT Pub. Date: Nov. 5, 2015

(65) Prior Publication Data
US 2017/0067391 A1     Mar. 9, 2017

(51) Int. Cl.
*F02B 23/06* (2006.01)
*F02B 25/08* (2006.01)

(52) U.S. Cl.
CPC ........ *F02B 23/0624* (2013.01); *F02B 23/066* (2013.01); *F02B 23/0663* (2013.01);
(Continued)

(58) Field of Classification Search
CPC .. F02B 23/0624; F02B 25/08; F02B 23/0687; F02B 23/0663; F02B 23/066;
(Continued)

(56) References Cited

U.S. PATENT DOCUMENTS 1,856,328 A * 5/1932 French ................... F02B 19/04
                                                         123/301
2,231,392 A * 2/1941 McCarthy ................ F02B 3/00
                                                         123/301
(Continued)

FOREIGN PATENT DOCUMENTS

DE          3214096 A1     11/1982
DE      19957461 A1 *  6/2001   .......... F02B 23/0624
(Continued)

OTHER PUBLICATIONS

European Official Action (dated Nov. 24, 2017) for corresponding European App. EP 14 890 716.5.
(Continued)

*Primary Examiner* — Sizo B Vilakazi
*Assistant Examiner* — Brian R Kirby
(74) *Attorney, Agent, or Firm* — WRB-IP LLP (57) ABSTRACT

An engine includes a combustion chamber including a cylinder wall defining a cylinder, a fuel injector disposed in a first opening in the cylinder wall and a piston head disposed in the cylinder. A piston bowl at least partially defined by a wall having a generally spiral shape is provided in a top of the piston head.

23 Claims, 6 Drawing Sheets

(52) U.S. Cl.
CPC ...... *F02B 23/0666* (2013.01); *F02B 23/0687* (2013.01); *F02B 25/08* (2013.01); *Y02T 10/125* (2013.01)

(58) Field of Classification Search
CPC ...... F02B 23/0666; F02B 23/06; F02B 23/08; Y02T 10/125; F02F 3/24; F02F 2/26
USPC .................................. 123/262, 263, 307
See application file for complete search history.

(56) References Cited

U.S. PATENT DOCUMENTS

| | | | | |
|---|---|---|---|---|
| 2,269,084 | A * | 1/1942 | McCarthy | F02B 23/00 123/298 |
| 2,504,036 | A * | 4/1950 | Morrison | F02B 3/00 123/262 |
| 2,600,440 | A * | 6/1952 | Smith | F02F 3/24 123/193.6 |
| 2,766,738 | A * | 10/1956 | Hoffmann | F02B 19/14 123/269 |
| 2,851,019 | A * | 9/1958 | Fleming | F02B 23/0627 123/262 |
| 3,641,986 | A * | 2/1972 | Fricker | F02B 3/02 123/260 |
| 4,166,436 | A * | 9/1979 | Yamakawa | F02B 23/08 123/193.6 |
| 4,467,752 | A * | 8/1984 | Yunick | F02B 23/08 123/193.5 |
| 4,858,579 | A * | 8/1989 | Elsbett | F02B 23/06 123/299 |
| 5,065,715 | A * | 11/1991 | Evans | F02B 23/08 123/263 |
| 5,103,784 | A * | 4/1992 | Evans | F02B 23/08 123/263 |
| 6,003,487 | A * | 12/1999 | Merritt | F02B 19/06 123/255 |
| 6,062,192 | A * | 5/2000 | Wirth | F02B 23/104 123/295 |
| 6,182,619 | B1 * | 2/2001 | Spitzer | F02B 25/08 123/51 B |
| 6,418,885 | B1 * | 7/2002 | Paul | F02D 19/081 123/25 C |
| 6,609,490 | B2 | 8/2003 | Flinchbaugh et al. | |
| 6,729,290 | B1 * | 5/2004 | Rorke | F01B 3/02 123/193.6 |
| 7,681,550 | B2 * | 3/2010 | Kobayashi | F02B 11/00 123/299 |
| 8,561,581 | B2 * | 10/2013 | Taylor | F02B 25/04 123/306 |
| 2006/0157003 | A1 * | 7/2006 | Lemke | F02B 75/28 123/41.38 |
| 2011/0067671 | A1 * | 3/2011 | Laimboeck | F02B 23/104 123/298 |
| 2011/0114070 | A1 * | 5/2011 | Liu | F02B 25/08 123/590 |
| 2011/0186017 | A1 * | 8/2011 | Lemke | F01B 7/04 123/51 R |
| 2011/0271932 | A1 | 11/2011 | Fuqua et al. | |
| 2012/0073541 | A1 | 3/2012 | Fuqua et al. | |
| 2012/0285418 | A1 * | 11/2012 | Elsbett | F01B 7/14 123/300 |
| 2013/0014718 | A1 * | 1/2013 | Shen | F02B 23/0675 123/18 A |
| 2013/0025556 | A1 | 1/2013 | Hofbauer | |
| 2013/0036999 | A1 | 2/2013 | Levy et al. | |
| 2013/0118441 | A1 * | 5/2013 | Levy | F02M 35/10091 123/197.4 |
| 2013/0146021 | A1 * | 6/2013 | Hofbauer | F02B 17/005 123/299 |
| 2013/0213342 | A1 * | 8/2013 | Burton | F02F 3/26 123/193.6 |
| 2014/0014063 | A1 * | 1/2014 | Redon | F02B 75/16 123/295 |
| 2014/0083396 | A1 * | 3/2014 | Burton | F01B 7/02 123/51 R |

FOREIGN PATENT DOCUMENTS

| | | | | |
|---|---|---|---|---|
| DE | 102012111776 | A1 | | 6/2013 |
| EP | 0909885 | A2 | | 4/1999 |
| EP | 2712394 | B1 | | 12/2016 |
| GB | 1076317 | A | | 7/1967 |
| JP | S6314836 | U | | 1/1988 |
| JP | 63113113 | A | | 5/1988 ........ F02B 23/0624 |
| JP | 63113113 | A | * | 5/1988 ........ F02B 23/0624 |
| JP | H084535 | A | * | 1/1996 ........ F02B 2275/14 |
| JP | 11117749 | A | * | 4/1999 ........ F02B 23/104 |
| JP | 2001073780 | A | * | 3/2001 ........ F02B 75/282 |
| SE | 102658 | L | * | 2/2003 |

OTHER PUBLICATIONS

International Search Report (dated Sep. 5, 2014) for corresponding International App. PCT/US2014/035773.

International Preliminary Report on Patentability (dated Apr. 7, 2016) for corresponding International App. PCT/US2014/035773.

European Official Action (dated Jul. 4, 2018) for corresponding European App. EP 14 890 716.5.

* cited by examiner

COMBUSTION CHAMBER FOR AN INTERNAL COMBUSTION ENGINE AND AN INTERNAL COMBUSTION ENGINE

BACKGROUND AND SUMMARY

Aspects of the present invention relate generally to internal combustion engines and, more particularly, to combustion chambers for internal combustion engines.

Opposed piston engines include a cylinder with a pair of pistons that move toward each other toward top dead center positions to compress gas in the cylinder and near which fuel is injected through a side wall of the cylinder. U.S. Patent App. US2012/0285418 and U.S. Patent App. US2013/0036999, which are incorporated by reference, describe the general structure and operation of an opposed piston engine. U.S. Patent App. US2012/0285418 observes that such engines require different arrangements for effective, mixing of fuel and air. Providing for effective mixing of fuel in air in conventional engine cylinders is, of course, also important.

It is desirable to provide an arrangement for effectively mixing fuel and air in an engine cylinder, particularly for an opposed piston engine cylinder.

According to an aspect of the present invention, a combustion chamber for an internal combustion engine comprises a cylinder wall defining a cylinder, a fuel injector disposed in a first opening in the cylinder wall, and a piston head disposed in the cylinder, a piston bowl at least partially defined by a wall having a generally spiral shape being provided in a top of the piston head.

According to another aspect of the invention, an engine comprising such a combustion chamber is provided.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figures 1, 2:
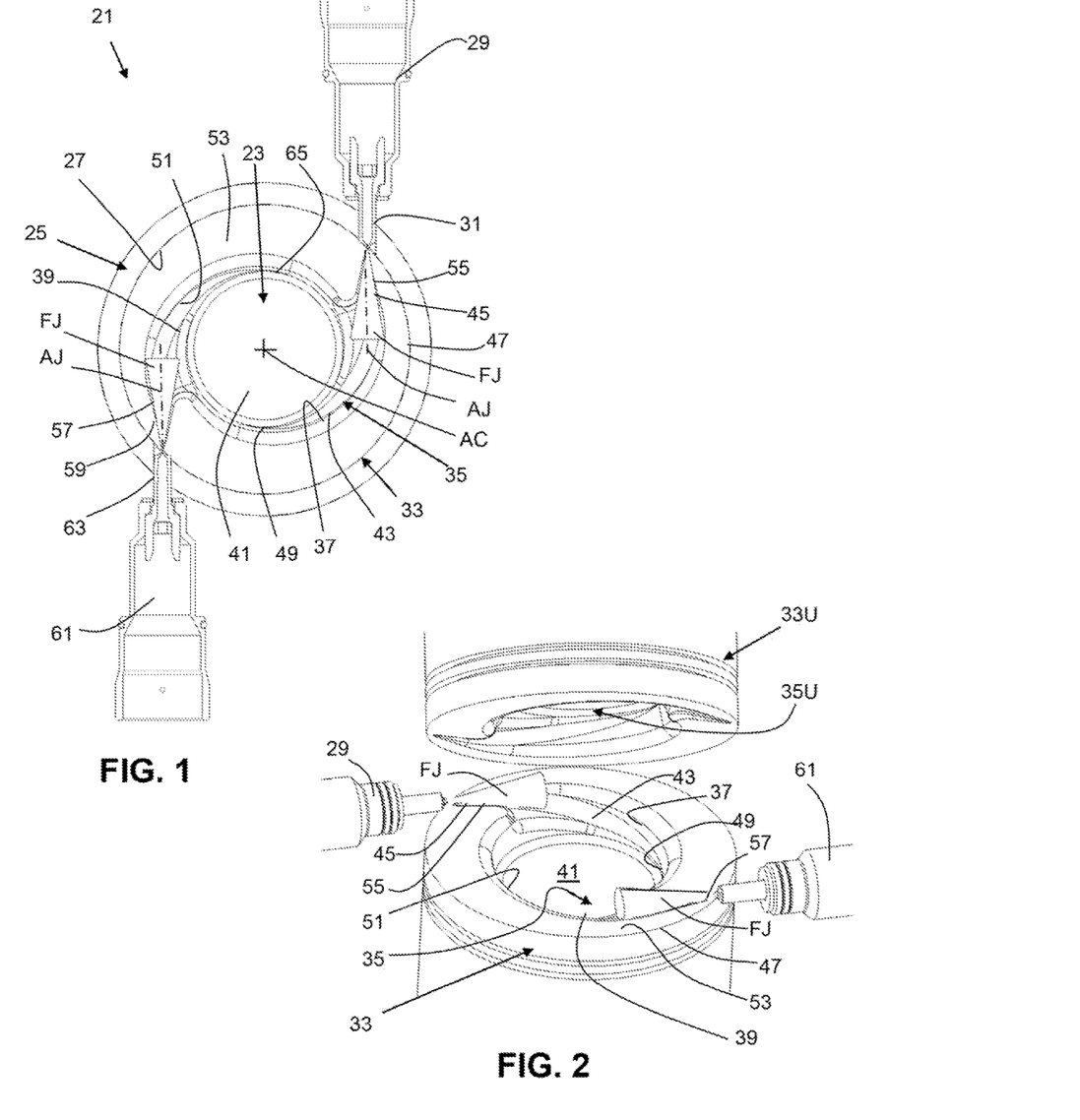
FIG. 1 is a top, partially cross-sectional view of an internal combustion engine according to an aspect of the present invention.
FIG. 2 is a perspective view of piston heads of an internal combustion engine according to an aspect of the present invention.

An internal combustion engine 21 according to an aspect of the present invention is seen in FIG. 1 and comprises a combustion chamber 23 comprising a cylinder wall 25 defining a cylinder 27. The cylinder wall 25 is ordinarily part of a cylinder liner or an engine block. As seen in FIGS. 1 and 2, a fuel injector 29 is disposed in a first opening 31 in the cylinder wall 25. A piston head 33 is movably disposed in the cylinder 25 and is linked to a crankshaft (not shown in FIG. 1 or 2) by a connecting rod (sometimes referred to as a conrod or pushrod) (not shown in FIG. 1 or 2). FIG. 2 shows piston heads 33 and 33U of an opposed piston arrangement, with the upper piston head 33U tilted to permit illustration of fuel jets FJ injected by fuel injectors 29.

Figures 3A, 3B:
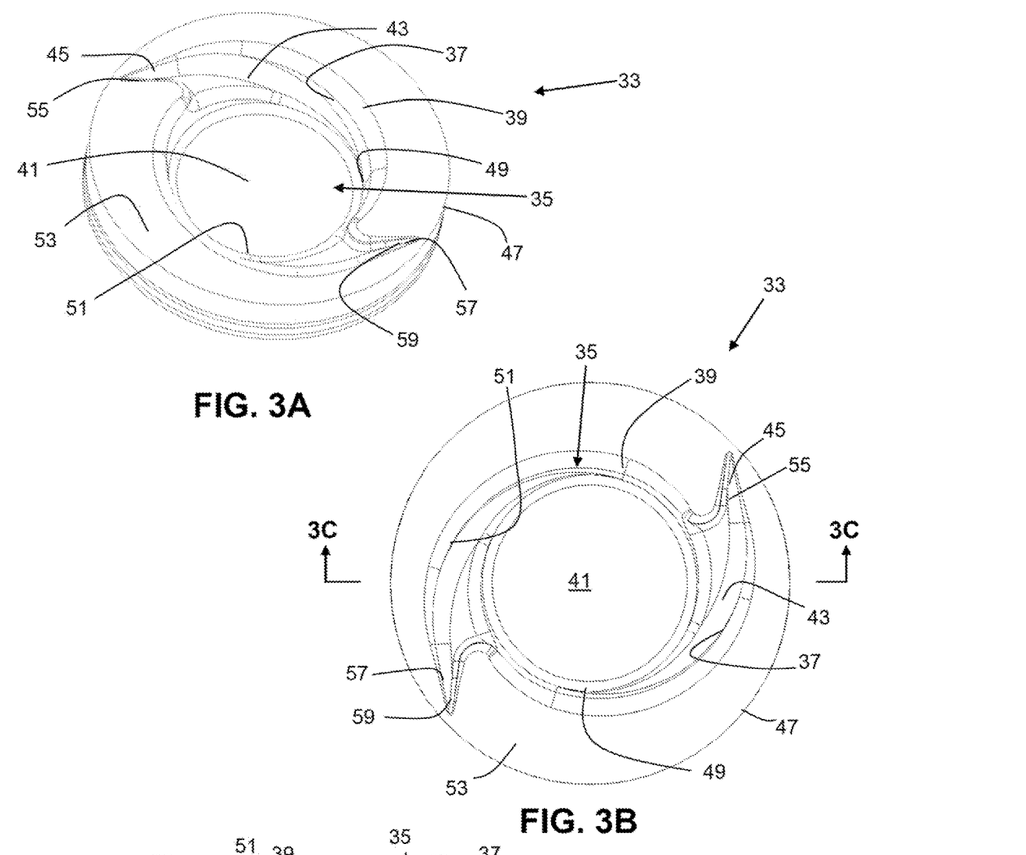
FIGS. 3A-3B are top perspective and top views of a piston head of an internal combustion engine according to an aspect of the present invention.
Figure 3C:
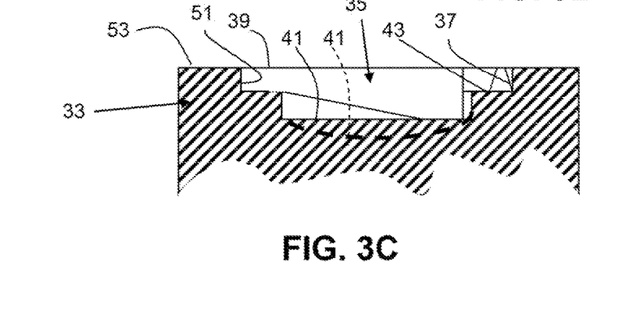
FIG. 3C is a cross-sectional view taken at section 3C-3C of FIG. 3B.

As seen, for example, in the piston head 33 shown in FIGS. 3A-3C, a piston bowl 35 that is at least partially defined by a wall 37 having a generally spiral shape is provided in a top 39 of the piston head 33. While the spiral may be a specific form of spiral, such as a logarithmic spiral, an Archimedean spiral, a hyperbolic spiral, etc., except where otherwise indicated, a "spiral" will be understood to be a curve that gets progressively closer to a central point as it revolves around the point. References to the "top" of the piston head 33 are intended to refer to the part of the piston head that, with the cylinder wall 25 defines the combustion chamber 23. It will be appreciated that the piston head may be oriented in an engine so that the "top" of the piston head is in fact vertically below the rest of the piston head (such as is seen in the upper piston head in the opposed piston arrangement shown in FIGS. 2, 5A and 5B), horizontally even with the rest of the piston head (such as when the cylinder 27 extends horizontally), or somewhere in between above, below, and horizontally even with.

In the embodiment shown in FIG. 2, it will be seen that the upper piston head 33U has a bowl 35U with a geometry that is a mirror image of the bowl 35 of the lower piston head 33. References herein to the piston head 33 or the bowl 35 of the piston head will be understood to apply equally to the upper piston head 33U and bowl 35U, the only differences being that the geometry of the bowls are reversed on the two piston heads. The volume of the piston bowl 35 depends upon a compression ratio that is desired to be obtained by the piston head 33 and cylinder 27. A depth of the spiral shaped wall 37 increases toward a center portion 41 of the piston bowl 35. In the embodiment shown in FIGS. 3A-3C, the piston bowl 35 is further defined by a ramp 43 that is defined on one edge by the spiral shaped wall 37 and on another edge by the center portion 41 of the piston bend and that descends from the top surface 53 of the piston head 33 to the center portion at a distance below the top surface. The fuel injector 29 can be oriented relative to piston bowl 35 so that a central axis AJ of an injected fuel jet FJ is generally parallel with the ramp 43 which can facilitate causing the mixture to "tumble" in the sense that, after proceeding downwardly into the bowl 35, it then moves upwardly again, as well as to "swirl" by moving circumferentially around the bowl. The fuel injector may, alternatively, be oriented so that the central axis of the injected fuel jet is generally perpendicular to a central axis AC of the cylinder as illustrated.

Figure 4A:
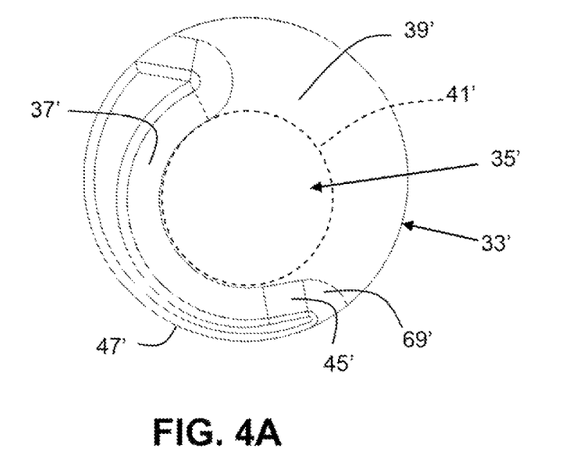
FIGS. 4A-4B are top views of a piston head of an internal combustion engine according to another aspect of the present invention, with FIG. 4B showing orientations of fuel injectors relative to the piston head.
Figure 4B:
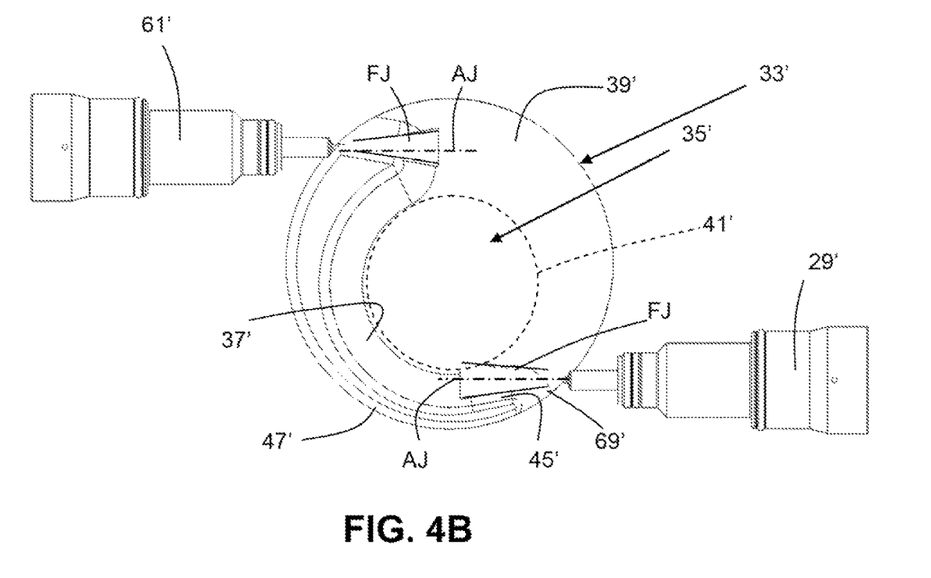
Figure 5A:
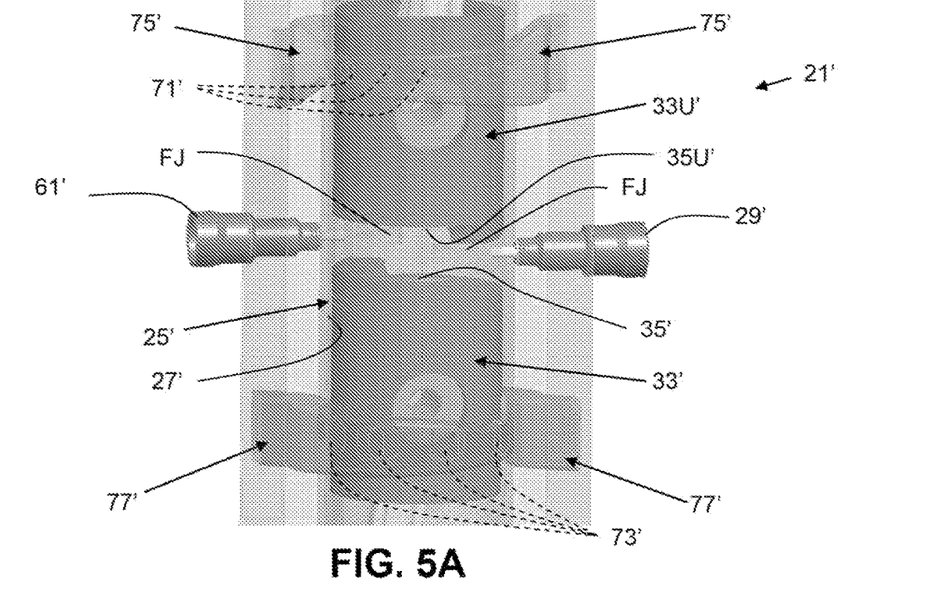
FIGS. 5A-5B are side, partially cross-sectional views of an internal combustion engine according to another aspect of the present invention.
Figure 5B:
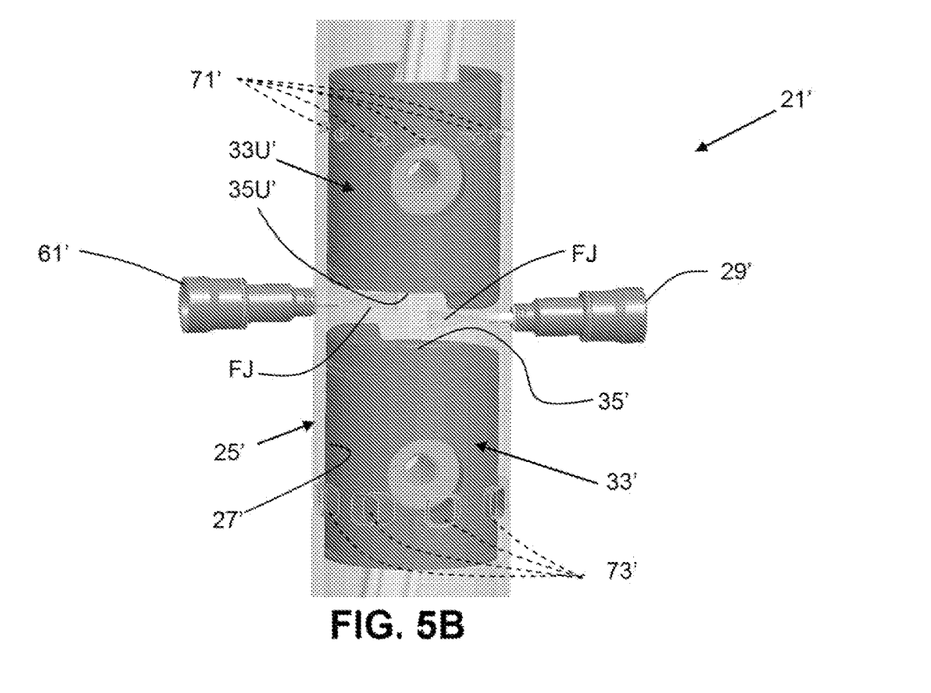

As seen in another embodiment of the piston bowl 35' shown in FIGS. 4A-4B, the outer end 45' of the spiral shaped wall 37' may extend to the peripheral edge 47' of the top 39' of the piston head 33' and the bowl may have no ramp. As seen in FIGS. 5A-5B, in such an embodiment, the fuel injectors can be (but is not necessarily) oriented so that the central axis of the injected fuel jet FJ is generally perpendicular to a central axis AC of the cylinder. The fuel injectors can, alternatively, be disposed at an angle to the perpendicular, which can further facilitate mixing of gas and fuel by causing the mixture to "tumble" in the sense that, after proceeding downwardly into the bowl 35', it then moves upwardly again, as well as to "swirl" by moving circumferentially around the bowl.

The spiral shape of the walls 37 and 37' facilitates creation of a circumferential swirling effect in the cylinder 27 and 27' that facilitates mixing of the injected fuel with incoming air and later with scavenging of exhaust gas. While dimensions will vary depending upon factors such as the size of the piston head 33 and cylinder 27, for a fuel jet FJ that is typically about 50 mm in length, the length of the walls 37 and 37' will ordinarily be between about 20 and 100 mm, more preferably between about 30 and 60 mm. In the illustrated embodiments, the circumferential swirling effect will be in the clockwise direction, however, it will be appreciated that the effect could alternatively be in the counter-clockwise direction As seen in the embodiment shown in FIGS. 3A-3B, the center portion 41 of the piston bowl 35 is ordinarily substantially circular in shape. This is true, as well, for the embodiment of the piston bowl 35' shown in FIGS. 4A-4B, as illustrated by the dotted line representing the circular central portion 41' however, the circular shape is more apparent in FIGS. 3A-3B. The spiral shaped wall 37 typically increases in depth from the outer end 45 of the spiral shaped wall toward an inner end 49 of the spiral shaped wall at the center portion 41. "Substantially" circular is defined herein as meaning approximating circular, but not necessarily exactly circular, as the precise boundaries of the substantially circular central portions may not be capable of precise definition as different surfaces merge into each other, or (as in the piston heads 33' shown in FIGS. 4A-4B) the shapes do not. As seen in FIG. 3C (cross-section of piston head), the center portion 41 of the piston bowl 35 can be substantially flat or, as shown in phantom, concave. Altering the depth and total volume of the piston bowl 35 alters the compression ratio that is desired to be obtained by the piston head 33 and cylinder 27.

In the embodiment shown in FIGS. 3A-3C, the bowl 35 of the piston head 33 is at least partially defined by a second wall 51 having a generally spiral shape. The first spiral shaped wall 37 and the second spiral shaped wall 51 are ordinarily rotationally symmetrical about the central axis AC of the cylinder 27. In the embodiment shown in FIGS. 3A-C, a top surface 53 of the top 39 of the piston head 33 is substantially flat, and the piston bowl 35 and the first and second spiral shaped walls 37 and 51 are recessed relative to the top surface. First and second recesses 55 and 57 defining outer ends 45 and 59 of the first and second spiral shaped walls 37 and 51, respectively, can be disposed inwardly from an outer peripheral edge 47 of the top 39 of the piston head 33.

As seen, for example, in FIGS. 1 and 2, a second fuel injector 61 can also be provided in a second opening 63 in the cylinder wall 25. The first and second fuel injectors 29 and 61 can be oriented relative to the piston bowl 35 so that central axes AJ of injected fuel jets FJ from the first and second fuel injectors are generally aligned with centers of the first and second recesses 55 and 57. Ordinarily, a center portion 41 of the piston bowl 35 is substantially circular in shape, and the first and second fuel injectors 29 and 61 are oriented relative to the piston bowl so that central axes AJ of injected fuel jets FJ from the first and second fuel injectors are offset relative to the central axis of the piston 33 so that they are tangent to the circle, or nearly tangent thereto, as illustrated in FIG. 1. The injectors 29 and 61 are illustrated as being disposed at approximately 180 degrees around the circumference of the cylinder 25 from each other, however, it is possible that the injectors could disposed at different angular relationships. Additionally, although two injectors are shown in the illustrated embodiments, it will be appreciated that one or more than two injectors may be provided in different embodiments.

In the embodiment of the piston head 33' shown in FIGS. 4A-4B, a periphery 47' of the top 39' of the piston head is recessed at an outer end 45' of the spiral shaped wall 37', i.e., the spiral shaped wall extends all the way to the periphery of the top of the piston head to define a recess 69'. As seen in FIG. 4B, the fuel injectors 29' and 61' are oriented relative to piston bowl 35' so that a central axis AJ of an injected fuel jet FJ is generally aligned with a center of the recess 69'. As seen, for example, in FIGS. 5A and 5B, the piston head 33' is ordinarily used with another upper piston head 33U in an opposed piston engine 21'. The piston head 33' and the upper piston head 33U' will be mirror images of each other, except that one is rotated 180 degrees around a central axis of the cylinder to the other. As before, references to the piston head 33' will be understood to apply equally to the piston head 33U', except where otherwise indicated. It will be appreciated that an opposed piston engine 21 using the piston heads 33 shown in FIGS. 1-3C can have the same basic constructions as the opposed piston engine 21' shown in FIGS. 5A-5B. Particularly when the two piston heads 33' and 33U' approach top dead center (TDC) and the spiral shaped walls 37' of the two piston heads are at their closest to the tops of the other one of the piston heads, the center portion 41' of the resulting piston bowl 35' is more clearly substantially circular in shape. As seen in FIG. 4B, the central axis AJ of the injected fuel jet FJ is offset from the central axis of the piston so that it is tangent to, or nearly tangent to, the resulting circle at the center portion 41'. The circle 41' defined by the spiral shaped wall 37' of the piston head 33' may be offset from the circle defined by the spiral shaped wall of the upper piston head 33U'. By not including a ramp, the spiral shaped walls 37' of the piston heads 33' and 33U' can be rather high, which can be helpful to avoid spraying fuel on the cylinder wall or liner.

Referring, for purposes of discussion, to FIGS. 5A-5B, a second fuel injector 61' can be disposed in a second opening 63' in the cylinder wall 25', and a second piston head 33' can be disposed in the cylinder 27'. The second piston head 33' can have a second piston bowl 35' at least partially defined by a second wall 51' having a generally spiral shape in a top 39' of the second piston head. The top 39' of the first piston head 33' faces the top of the second piston head. It will be appreciated that the piston heads 33' can be replaced by the piston heads 33 shown in, e.g., FIGS. 1-3C.

As seen in FIG. 5A (in phantom) and FIG. 5B, at least one inlet port 71' ordinarily a plurality of inlet ports) can be provided in the cylinder wall 25' below a top dead center (TDC) and above a bottom dead center (BDC) of the first or "upper" piston bead 33' and at least one outlet port 73 (and ordinarily a plurality of outlet ports) can be provided in the cylinder wall below a TDC and above a BDC of the second or "lower" piston head 33'. References to "above" and "below" when referring to TDC or BDC relate to the positions of the pistons in the cylinder, where TDC will always be considered to be above BDC regardless of the orientation of the cylinder or the direction of movement of the piston head toward TDC or BDC. References to "upper" or "lower" when referring to the two piston heads 33' are only with reference to their positions in the embodiment illustrated, and it will be appreciated that the cylinder 27' can be oriented differently than shown with the inlet ports vertically above the outlet ports, such as where the inlet and outlet ports are horizontally even with each other, the inlet ports are all vertically below the outlet ports, or something in between with some inlet ports being above some outlet ports and some outlet ports being above some inlet ports.

Figure 6A:
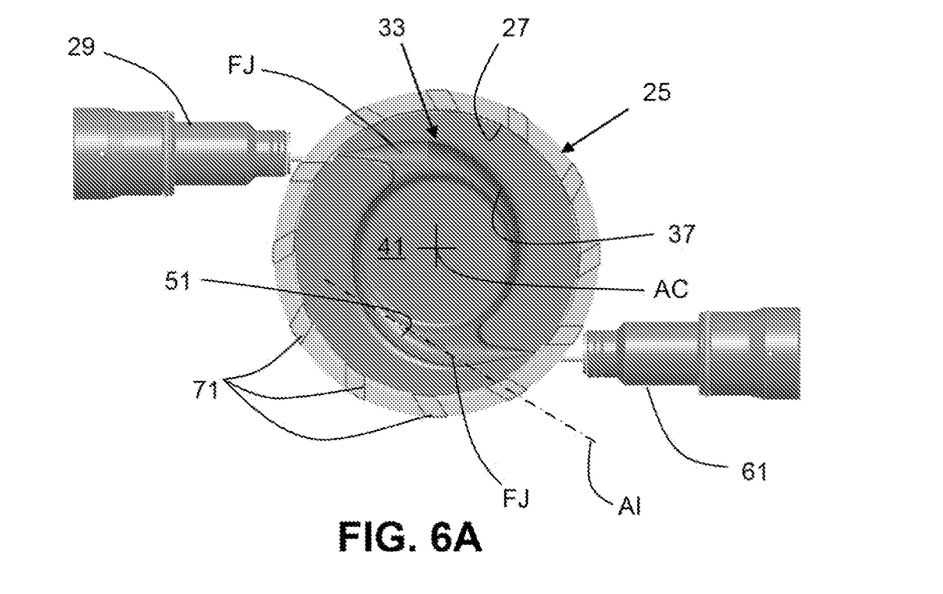
FIG. 6A is a top view of a piston in an internal combustion engine according to an aspect of the present invention showing an orientation of inlet ports in a cylinder relative to an upper piston of an opposed piston engine.
Figure 6B:
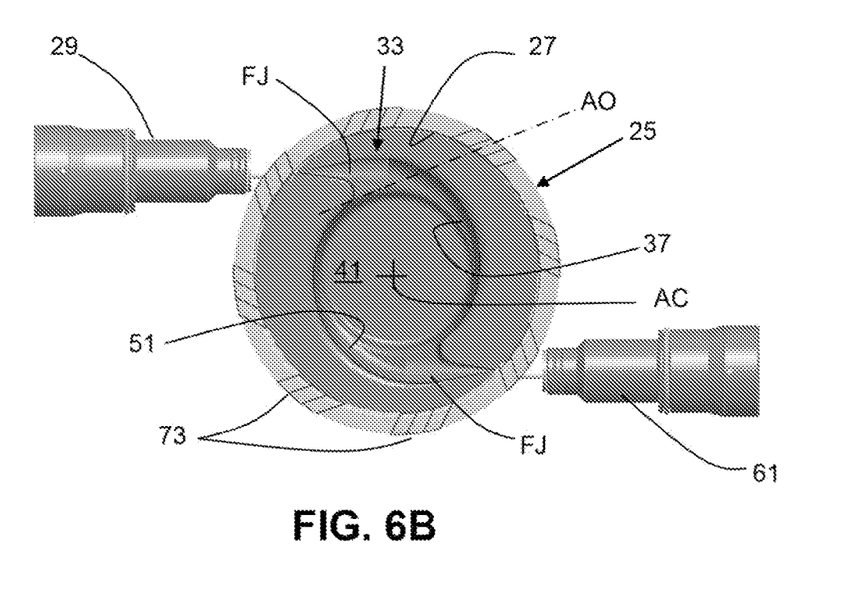
FIG. 6B is a top view of a piston in an internal combustion engine according to an aspect of the present invention showing an orientation of outlet ports relative to a lower piston of an opposed piston engine.

As seen in FIG. 6A, which shows a piston head 33 as in FIGS. 1-3C, the center portions 41 of the first and second piston howls 35 can be substantially circular in shape, and a central axis AI of the at least one inlet port 71 can be offset relative to the central axis AC of the cylinder 27 and substantially tangent to the center portions of the first and second piston bowls. In the embodiment of the engine 21' seen in FIGS. 5A and 5B, the piston head 33 seen in FIG. 6A would be the lower piston head. As seen in FIG. 6B, a central axis AO of the at least one outlet port 73 can also be offset relative to the central axis AC of the cylinder 27 and substantially tangent to the center portions 41 of the first and second piston bowls 35. In the embodiment of the engine 21' seen in FIGS. 5A and 5B, the piston head 33 seen in FIG. 6B would also be the lower piston head. The inlet ports 71' and outlet ports 73' of the cylinders 27' shown in FIGS. 5A-5B will ordinarily also be oriented in the manner shown in FIGS. 6A and 6B. The orientation of the inlet ports 71 and outlet ports 73 in the manner shown in FIGS. 6A and 6B, together with the spiral shape of the walls 37 (and 37' for the piston 33 of FIGS. 4A-5B) facilitates creation of a circumferential swirling effect in the cylinder 27 that facilitates mixing of the injected fuel with incoming air and later with scavenging of exhaust gas. It will be appreciated that, instead only one of the central axes AI or AO of the inlet ports 71 or the outlet ports 73, or none, might, instead be substantially tangent to the center portions 41' of the first and second piston bowls 35. As seen in FIG. 5A, inlet ducts 75' and outlet ducts 77" (shown as transparent features) can extend around the cylinder 27' and lead to each of a plurality of inlet ports 71' and outlet ports 73', respectively.

Figure 7A:
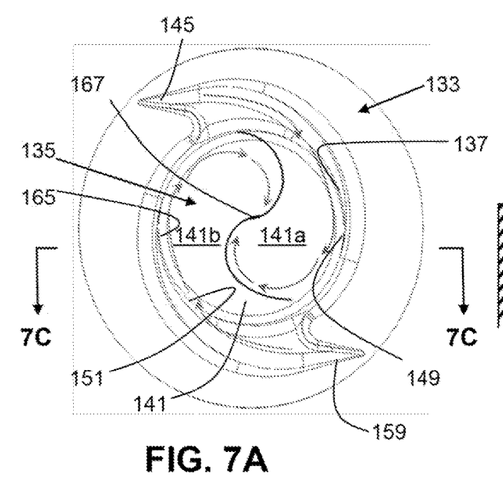
FIG. 7A is a top view of a piston head according to another aspect of the present invention.
Figure 7B:
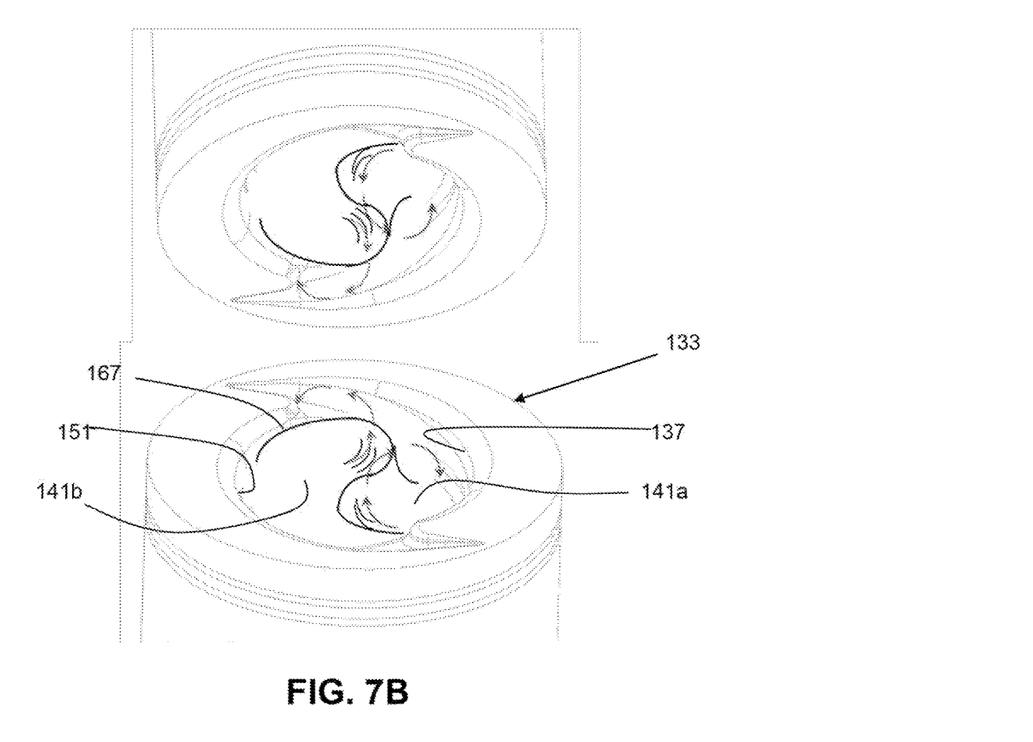
FIG. 7B is a perspective view of piston heads of the type shown in FIG. 7A.
Figure 7C:
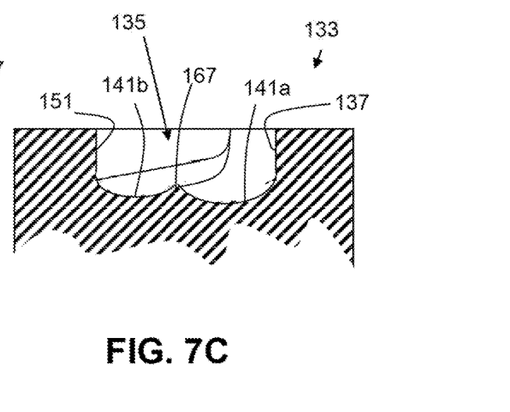
FIG. 7C is a cross-sectional view taken it section 7C-7C of the piston head of FIG. 7A.

In a further embodiment shown in FIGS. 7A-7C, the first and second spiral shaped walls 137 and 151 can increase in depth from the outer ends 145 and 159 of the first and second spiral shaped walls toward inner ends 149 and 165 of the first and second spiral shaped walls at a substantially circular center portion 141 of the piston bowl 135. The inner ends 149 and 165 of the first and second spiral shaped walls 137 and 151 can merge into an S-shaped partition 167 between two concave portions 141*a* and 141*b* of the center portion of the piston bowl. The concave portions 141*a* and 141*b* form a "yin and yang" geometry when viewed along the central axis of the piston head. The concave portions 141*a* and 141*b* are generally teardrop shaped in that they increase from a minimal depth at the outer end of the spiral shaped walls to a largest depth close to the inner end of the spiral shaped walls and then back to a zero depth over a relatively short distance. As seen by the arrows reflecting the flow of gas in the concave portions 141*a* and 141*b*, this geometry further facilitates mixing of fuel and air by causing the gas and fuel to "tumble" in the sense that, after proceeding downwardly into the bowl 135, it is then caused to move upwardly again, as well as to "swirl" by moving circumferentially around the bowl.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A combustion chamber for an internal combustion engine, comprising:
   a cylinder wall defining a cylinder;
   a first fuel injector disposed in a first opening in the cylinder wall and a second fuel injector disposed in a second opening in the cylinder wall; and
   a piston head disposed in the cylinder, a piston bowl at least partially defined by a first wall having a generally spiral shape and by a second wall having a generally spiral shape being provided in a top of the piston head, wherein a center portion of the piston bowl is substantially circular in shape, wherein the first and second fuel injectors are oriented relative to the piston bowl so that central axes of injected fuel jets from the first and second fuel injectors are tangent to the center portion.

2. The combustion chamber for an internal combustion engine as set forth in claim 1, wherein depths of the first and second spiral shaped walls increase toward a center portion of the piston bowl.

3. The combustion chamber for an internal combustion engine as set forth in claim 2, wherein the piston bowl is further defined by first and second ramps defined on one edge by the first and second spiral shaped walls, respectively, and on another edge by the center portion of the piston bowl.

4. The combustion chamber for an internal combustion engine as set forth in claim 3, wherein the first and second fuel injectors are oriented relative to the piston bowl so that central axes of injected fuel jets are generally perpendicular to a central axis of the piston.

5. The combustion chamber for an internal combustion engine as set forth in claim 1, wherein the first and second spiral shaped walls increase in depth from the outer ends of the first and second spiral shaped walls toward inner ends of the first and second spiral shaped walls at the center portion.

6. The combustion chamber for an internal combustion engine as set forth in claim 1, wherein the center portion of the piston bowl is substantially flat.

7. The combustion chamber for an internal combustion engine as set forth in claim 1, wherein the center portion of the piston bowl is concave.

8. The combustion chamber for an internal combustion engine as set forth in claim 1, wherein the first spiral shaped wall and the second spiral shaped wall are rotationally symmetrical.

9. The combustion chamber for an internal combustion engine as set forth in claim 1, wherein a top surface of the top of the piston head is substantially flat, and the piston bowl and the first and second spiral shaped walls are recessed relative to the top surface.

10. The combustion chamber for an internal combustion engine as set forth in claim 9, wherein first and second recesses defining outer ends of the first and second spiral shaped walls are disposed inwardly from an outer peripheral edge of the top of the piston head.

11. The combustion chamber for an internal combustion engine as set forth in claim 10, wherein the first and second fuel injectors are oriented relative to the piston bowl so that central axes of injected fuel jets from the first and second fuel injectors are generally aligned with centers of the first and second recesses.

12. The combustion chamber for an internal combustion engine as set forth in claim 1, wherein the first and second spiral shaped walls increase in depth from the outer ends of the first and second spiral shaped walls toward inner ends of the first and second spiral shaped walls.

13. The combustion chamber for an internal combustion engine as set forth in claim 12, wherein the inner ends of the first and second spiral shaped walls merge into an S-shaped partition between two concave portions of the center portion of the piston bowl.

14. The combustion chamber for an internal combustion engine as set forth in claim 1, wherein the first and second spiral shaped walls are between 20-100 mm in length.

15. The combustion chamber for an internal combustion engine as set forth in claim 1, wherein a periphery of the top of the piston head is recessed at an outer end of the first and second spiral shaped walls.

16. The combustion chamber for an internal combustion engine as set forth in claim 15, wherein the first and second fuel injectors are oriented relative to the piston bowl so that central axes of first and second injected fuel jets are generally aligned with centers of recesses at the outer ends of the first and second spiral shaped walls.

17. The combustion chamber for an internal combustion engine as set forth in claim 1, comprising a second piston head disposed in the cylinder, a second piston bowl at least partially defined by a second wall having a generally spiral shape being provided in a top of the second piston head, the top of the first piston head facing the top of the second piston head.

18. The combustion chamber for an internal combustion engine as set forth in claim 17, wherein the second piston head is a mirror image of the first piston head.

19. The combustion chamber for an internal combustion engine as set forth in claim 17, comprising at least one inlet port in the cylinder wall below a top dead center and above a bottom dead center of the first piston head and at least one outlet port in the cylinder wall below a top dead center and above a bottom dead center of the second piston head.

20. The combustion chamber for an internal combustion engine as set forth in claim 19, wherein center portions of the first and second piston bowls are substantially circular in shape, and a central axis of the at least one inlet port is offset relative to the central axis of the cylinder and substantially tangent to the center portions of the first and second piston bowls.

21. The combustion chamber for an internal combustion engine as set forth in claim 20, wherein a central axis of the at least one outlet port is offset relative to the central axis of the cylinder and substantially tangent to the center portions of the first and second piston bowls.

22. The combustion chamber for an internal combustion engine as set forth in claim 19, wherein center portions of the first and second piston bowls are substantially circular in shape, and a central axis of the at least one outlet port is offset relative to the central axis of the cylinder and substantially tangent to the center portions of the first and second piston bowls.

23. An internal combustion engine comprising a combustion chamber as set forth in claim 1.

* * * * *